USO11354130B1

(12) United States Patent
Borkovic

(10) Patent No.: US 11,354,130 B1
(45) Date of Patent: Jun. 7, 2022

(54) EFFICIENT RACE-CONDITION DETECTION

(71) Applicant: Amazon Technologies, Inc., Seattle, WA (US)

(72) Inventor: Drazen Borkovic, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 16/824,404

(22) Filed: Mar. 19, 2020

(51) Int. Cl.
*G06F 9/38* (2018.01)
*G06F 11/34* (2006.01)
*G06F 11/30* (2006.01)

(52) U.S. Cl.
CPC ........ *G06F 9/3838* (2013.01); *G06F 11/3024* (2013.01); *G06F 11/3495* (2013.01)

(58) Field of Classification Search
None
See application file for complete search history.

(56) References Cited

U.S. PATENT DOCUMENTS

| 6,536,019 | B1* | 3/2003 | Ouyang | G06F 30/33 716/136 |
| 7,017,129 | B2* | 3/2006 | Ouyang | G06F 30/33 716/108 |
| 7,243,319 | B2* | 7/2007 | Ouyang | G06F 30/33 716/108 |
| 7,657,792 | B2* | 2/2010 | Krauss | G06F 11/3612 714/38.14 |
| 8,732,142 | B2* | 5/2014 | Petersen | G06F 16/2308 707/704 |
| 9,081,628 | B2* | 7/2015 | Ma | G06F 9/52 |
| 9,552,206 | B2* | 1/2017 | Johnson | G06F 9/3552 |
| 9,684,550 | B2* | 6/2017 | Bhartia | G06F 11/00 |
| 9,858,128 | B2* | 1/2018 | Bhartia | G06F 11/3024 |
| 10,216,552 | B2* | 2/2019 | Bhartia | G06F 9/542 |
| 2003/0140326 | A1* | 7/2003 | Ouyang | G06F 30/33 716/108 |

(Continued)

OTHER PUBLICATIONS

Do-Mai, Anh-Tu, Thanh-Dang Diep, and Nam Thoai. "Race condition and deadlock detection for large-scale applications." 2016 15th International Symposium on Parallel and Distributed Computing (ISPDC). IEEE, 2016. (Year: 2016).*

(Continued)

*Primary Examiner* — Matthew J Brophy
(74) *Attorney, Agent, or Firm* — Kilpatrick Townsend & Stockton LLP

(57) ABSTRACT

Techniques for detecting a data race condition between multiple execution engines of an integrated circuit device are provided. Computations and data movements involving execution engines of an integrated circuit may be described with a flow graph, where graph nodes represent computation or data movement operations and graph edges represent dependencies between the operations. When a graph has incorrect dependencies, data races may result. To detect data race conditions, compiler-generated vector clocks that track the relationships of operations performed by various execution engines may be used to determine concurrent operations between nodes of different execution engines, and memory access patterns for the operations may be compared to determine if the concurrent operations access the same memory address.

20 Claims, 10 Drawing Sheets

(56) References Cited

U.S. PATENT DOCUMENTS

| | | | | |
|---|---|---|---|---|
| 2005/0038806 A1* | 2/2005 | Ma | ............ | G06F 9/546 |
| | | | | 707/999.102 |
| 2007/0074210 A1* | 3/2007 | Cohen | ............ | G06F 11/3688 |
| | | | | 718/100 |
| 2007/0192545 A1* | 8/2007 | Gara | ............ | G06F 9/3828 |
| | | | | 711/E12.024 |
| 2008/0162776 A1* | 7/2008 | Krauss | ............ | G06F 11/3612 |
| | | | | 711/E12.001 |
| 2008/0209436 A1* | 8/2008 | Agha | ............ | G06F 11/3688 |
| | | | | 718/106 |
| 2009/0222825 A1* | 9/2009 | Upadhyaya | ......... | G06F 11/3632 |
| | | | | 718/102 |
| 2009/0248689 A1* | 10/2009 | Petersen | ............ | G06F 16/2308 |
| 2011/0320745 A1* | 12/2011 | Zhang | ............ | G06F 11/3624 |
| | | | | 711/E12.001 |
| 2012/0131309 A1* | 5/2012 | Johnson | ............ | G06F 8/40 |
| | | | | 712/E9.004 |
| 2012/0303910 A1* | 11/2012 | Ma | ............ | G06F 11/3632 |
| | | | | 711/E12.001 |
| 2013/0305252 A1* | 11/2013 | Venkataraman | .... | G06F 11/0751 |
| | | | | 718/103 |
| 2016/0364315 A1* | 12/2016 | Lee | ............ | G06F 11/3604 |
| 2017/0004024 A1* | 1/2017 | Bhartia | ............ | G06F 11/3495 |
| 2017/0004061 A1* | 1/2017 | Bhartia | ............ | G06F 11/3495 |
| 2018/0095808 A1* | 4/2018 | Bhartia | ............ | G06F 11/2289 |

OTHER PUBLICATIONS

Raychev, Veselin, Martin Vechev, and Manu Sridharan. "Effective race detection forevent-driven programs." Proceedings of the 2013 ACM SIGPLAN international conference on Object oriented programming systems languages & applications. 2013. (Year: 2013).*

Dilworth, R.P., "A Decomposition Theorem for Partially Ordered Sets," Annals of Mathematics, vol. 51, No. 1, Jan. 1950, pp. 161-166.

Fidge, "Timestamps in Message-Passing Systems that Preserve the Partial Ordering," Australian Computer Science Communications, vol. 10, No. 1, Feb. 1988, pp. 56-66.

Lamport, "Time, Clocks, and the Ordering of Events in a Distributed System," Communications of the ACM, vol. 21, No. 7, Jul. 1978, pp. 558-565.

Mattern, "Virtual Time and Global States of Distributed Systems," Department of Computer Science, University of Kaiserslautern, Parallel and Distributed Algorithms, Elsevier Science Publishers B.V., 1989, pp. 120-131.

* cited by examiner

| Engine_0 | Nodes and Vector Clock Values of Engine_1 | Comparison of Vector Clock Values Op_3 vs Nodes of Engine_1 | Segments |
|---|---|---|---|
| Node Op_3 of Engine_0 with vvc=[3,2,1] | Op_1 = [0,1,0] | > | Initial |
| | Op_2 = [0,2,1] | > | |
| | Op_3 = [1,3,1] | ⊥ | Middle |
| | Op_4 = [2,4,1] | ⊥ | |
| | Op_5 = [3,5,1] | < | Final |
| | Op_6 = [4,6,2] | < | |

FIG. 5B

EFFICIENT RACE-CONDITION DETECTION

BACKGROUND

Integrated circuit devices, such as processors, accelerators, and others, can include multiple computation and data-movement engines. For example, the integrated circuit device can include parallel computation engines that are capable of performing large, multi-stage computations, such as convolutions. As another example, the integrated circuit device can include computation engines for more specific operations, such as accumulating values or performing floating point math.

The computations and data movements may be described with a flow graph, where graph nodes represent computation or data movement operations (e.g., activation, matrix multiplication, pooling, etc.) and graph edges represent dependencies between operations. When a graph has incorrect dependencies, data races may result. For example, an operation being performed by one execution engine could be overwriting older data being read by an operation performed by another execution engine before the operation performed by the other execution engine is done reading the data. Another type of data race can occur when two execution engines write data in the same section of memory at the same time. In such cases, the result may depend on the relative speed of the two execution engines.

BRIEF DESCRIPTION OF THE DRAWINGS

Various embodiments in accordance with the present disclosure will be described with reference to the drawings, in which:

FIG. 5B is a table summarizing results of determining graph segments as explained with respect to FIG. 5A according to some aspects of the present disclosure;

DETAILED DESCRIPTION

The operations of an integrated circuit device such as a processor can be directed by instructions, which can be generated for the integrated circuit device by a compiler. A compiler is a software program that transforms programs written in human-readable programming language into machine language that can be understood by the integrated circuit device. The output of a compiler can be referred to as program code, program instructions, or machine instructions, among other examples.

When an integrated circuit device includes multiple execution engines, in various examples, the compiler for the device can produce sets of instructions for each execution engine. The instructions for an execution engine can includes steps such as reading data from memory of the device, performing a computation on the data, and writing a result of the computation back to the memory of the device. In some examples, the execution engines can independently execute respective sets of instructions, so that the execution engines can operate in parallel.

In some examples, however, the operation of one execution engine may be dependent on the operation of another execution engine. For example, a result computed by one execution engine may be needed as the input of an operation to be performed by a second execution engine. Limitations of the integrated circuit device can also cause dependencies between the execution engines. For example, the device may have a limited amount of memory or a limited number of registers in which inputs for and results from the execution engines can be stored. In this example, one execution engine may need to store a result in a memory location in which the inputs for another execution engine are stored.

When the operations of the execution engines of an integrated circuit device can have dependencies such as those described above, the compiler for the device can capture the dependencies, for example, in a dependency or dataflow graph. In a dependency graph, nodes in the graph can represent operations or sets of operations to be performed by individual execution engines. The edges or connections between the nodes can represent dependencies between the operations at the nodes.

Figure 1:
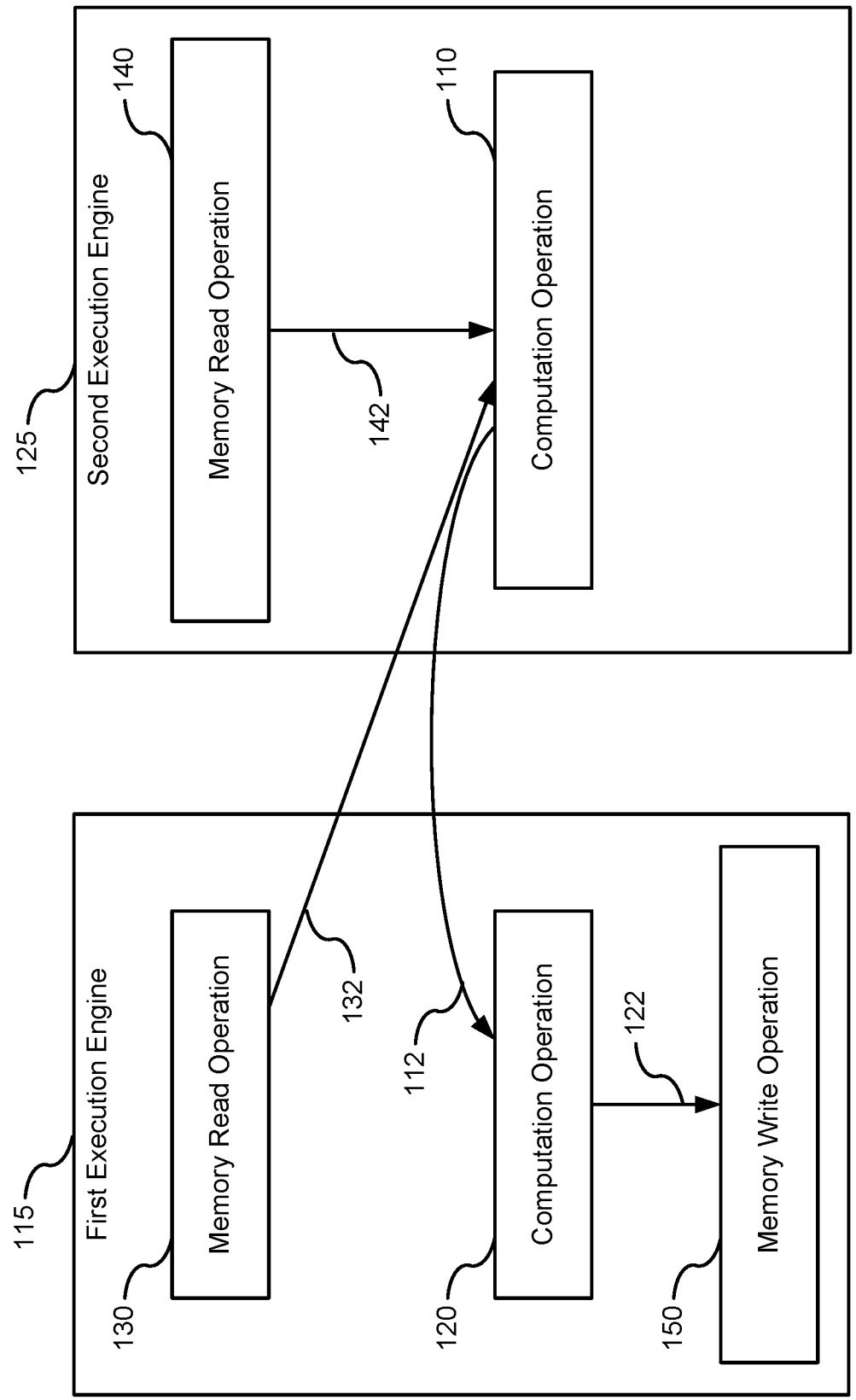
FIG. 1 is a diagram illustrating an example of operations in a dependency graph as these operations may be executed by a first execution engine and a second execution engine according to some aspects of the present disclosure.

FIG. 1 is a diagram illustrating an example of operations in a dependency graph as these operations may be executed by a first execution engine 115 and a second execution engine 125 according to some aspects of the present disclosure. The first execution engine 115 can be, for example, a pooling engine of an integrated circuit device, and the second execution engine 125 can be a computational array of an integrated circuit device, among other examples. With respect to a dependency graph, a node may refer to operation(s) to be performed by an execution engine, the terms "operations" and "nodes" may be used interchangeably herein.

In the example of FIG. 1, the operations of node 130, which includes a memory read operation, are performed by the first execution engine 115 and the operations of node 140, which also include a memory read operation, are performed by the second execution engine 125. The second execution engine 125 then performs the operations of node 110, which include a computation operation on the outputs of node 130 and node 140. As illustrated by this example, the computation of node 110 uses the output of the memory read operation of node 130, and thus needs the operation of node 130 to complete before the computation can be performed. Edge 132 thus illustrates a data or resource dependency between the first execution engine 115 and the second execution engine 125. In contrast, the computation of node 110 also needs the memory read operation of node 140 to be completed, but because the operations of node 140 and node 110 are performed by the same execution engine, the edge 142 does not represent a data or resource dependency because the second execution engine 125 need not wait on another execution engine in order to proceed to the operations of node 110.

Similarly, edge 112 illustrates a dependency between the first execution engine 115 and the second execution engine 125. For example, the computation operation of node 120 may require the result of the computation operation of node 110. Edge 122 further illustrates a non-dependency, since the operations of node 150 can follow the operations of node 120 without needing to wait for the operations of another execution engine to complete.

When the operations of the execution engines of an integrated circuit device can have dependencies such as those described above, the compiler for the device can capture the dependencies, for example, in a dependency graph. In a dependency graph, nodes in the graph can represent operations or sets of operations to be performed by individual execution engines. The edges or connections between the nodes can represent dependencies between the operations at the nodes.

When a graph has incorrect dependencies, data races may result. During data race analysis, two operations, op1 and op2, also referred to herein as nodes (e.g., nodes n1 and n2), in the graph constitute a data race if the operations are concurrent and the operations interfere. Two operations, or nodes, are concurrent when a path in the graph between the two nodes does not exist. The operations, or nodes, interfere when both operations write to at least one common memory address, or one operation reads data from a memory address and the other operation writes data to the same memory address.

According to some aspects of the present disclosure, when the compiler generates the graph, vector clocks may also be generated by the compiler to track the relationships of operations to be performed (or equivalently, nodes in the graph to be traversed) by various execution engines. Concurrent pairs of operations performed by different execution engines may be identified using vector clocks, data race conditions between the concurrent operations may be detected, and pairs of operations not having data race conditions may be validated.

Based on the dependency graph, each node, or operation, of an execution engine may be compared to the operations of every other execution engine. The vector clocks can be compared between node pairs formed by a given node and nodes of other execution engines. A comparison of the vector clocks may determine whether operations (nodes) are executed concurrently or serially. For concurrently executing operations, memory access patterns may be determined, and, if the memory access patterns for the concurrent operations include overlapping memory address ranges, individual memory addresses may be compared to determine whether data race conditions exist. Using vector clocks to determine which operations are concurrent operations can reduce the amount of processing time needed to identify the operations with potential race conditions. Identifying the concurrent operations and analyzing the memory access patterns for only those of the operations identified to be concurrent can further reduce the processing time as compared to analyzing every combination of operations.

Figure 2A:
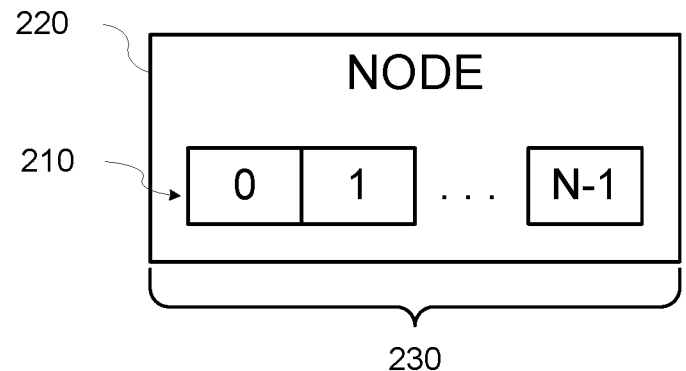
FIG. 2A is a diagram representing an example of vector clocks associated with a dependency graph node according to some aspects of the present disclosure.

FIG. 2A is a diagram representing an example of a vector clock associated with a dependency graph node according to some aspects of the present disclosure. Referring to FIG. 2A, the compiler may generate a vector clock 210 for each node 220 in a dependency graph. The vector clock 210 may track and increment values of the vector clock elements for operations performed by each execution engine of an integrated circuit. For example, an integrated circuit (e.g., an accelerator) may have N execution engines. Accordingly, the vector clock 210 for each node 220 may have N elements 230 (designated, for example, as elements 0 to N−1), each element corresponding to operations performed by one of the N execution engines.

The value of each element of a vector clock may be incremented based on an operation performed or node traversed by the corresponding execution engine. As referred to herein, the terms "operation" and "node" may be used interchangeably to refer to a node of a dependency graph. The operation or node may include one operation or a series of operations. The values of the vector clock elements may be associated with the endpoints of the operations or nodes. Element values for a vector clock of a subsequent node may replicate the element values of the vector clocks of preceding nodes that have input edges to the subsequent node. A preceding node is a node that happens before a subsequent node and provides an essential edge input to the subsequent node.

Figure 2B:
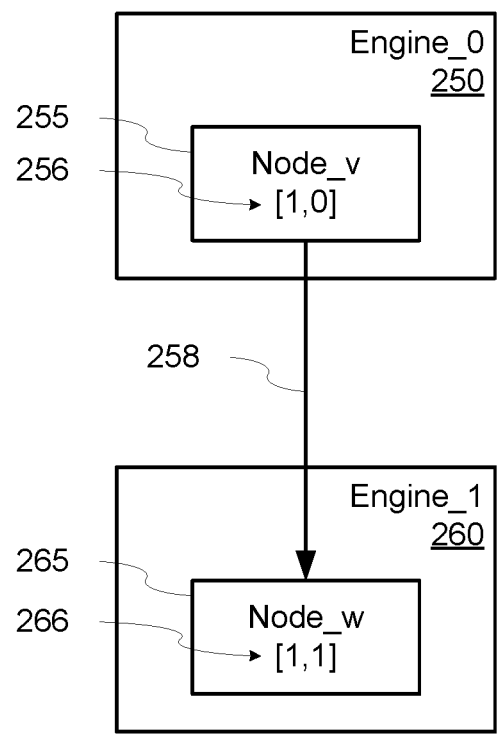
FIG. 2B is a diagram representing an example of incrementing element values of the vector clocks according to some aspects of the present disclosure.

FIG. 2B is a diagram illustrating an example of incrementing element values of the vector clocks according to some aspects of the present disclosure. FIG. 2B illustrates two execution engines, Engine_0 250 having a node (node_v 255), and Engine_1 260 having a node (node_w 265). Node_v 255 includes a representation of a vector clock 256, and node_w 265 includes a representation of a vector clock 266. Each vector clock 256, 266 includes two elements, with the leftmost element (element_0) corresponding to a node traversed (or operation performed) by Engine_0 250 and the rightmost element (element_1) corresponding to a node traversed (or operation performed) by Engine_1 260. The vector clocks 256, 266 illustrate the element values associated with the endpoints of the operations or nodes for Engine_0 250 and Engine_1 260.

As illustrated in FIG. 2B, the leftmost element (element_0) corresponding to Engine_0 250 is set to "1" in the vector clock 256 for node_v 255 since the element value is associated with an endpoint of the operation at node_v 255. The rightmost element (element_1) corresponding to Engine_1 260 is set to "0" since Engine_1 260 does not provide an input edge to node_v 255 of Engine_0 250. Thus, the element values for the vector clock 256 for node_v 255 are [1, 0].

Edge 258 is an output from node_v 255 and an input to node_w 265. Node_w 265 is therefore a subsequent node to node_v 255 and receives the input edge from node_v 255. Node_v 255 is a preceding node to node_w 265. Accordingly, the element value of element_0 (e.g., the leftmost element) corresponding to node_v 255 of Engine_0 250 for the vector clock 266 for node_w 265 replicates the element value of "1" from the vector clock for the preceding node_v 255. The element value for the rightmost element (element_1) corresponding to node_w 265 of Engine_1 260 is incremented since the element value is associated with an endpoint of the operation at node_w 265. Thus, the element values for the vector clock 266 for node_v 265 are [1, 1].

The element values for the vector clock of a subsequent node may replicate the maximum element values from all the preceding nodes.

For ease of explanation, the value of a vector clock (vvc) can be denoted with reference to the execution engine and the node within the execution engine. For example, referring to FIG. 2B, the value of the vector clock for Node_v may be denoted as vvc[Engine_0] [Node_v]=[1, 0]. Likewise, the value of the vector clock for Node_w may be denoted as vvc[Engine_1] [Node_w]=[1, 1].

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A compiler may generate a network description, for example, a dependency graph, for a network such as a neural network or other network. The dependency graph may specify sequences of operations performed by a set of execution engines, as well as vector clocks for the operations. The vector clocks may be used to determine relationships between the operations, for example whether the operations are executed sequentially or concurrently. Based on the network description and the vector clocks, a software tool executing on a processor of a computer system (possibly as part of the compiler) may examine operations to be performed by the execution engines to detect data race conditions between pairs of operations or validate that no data race conditions exist between the pairs of operations.

Figure 3A:
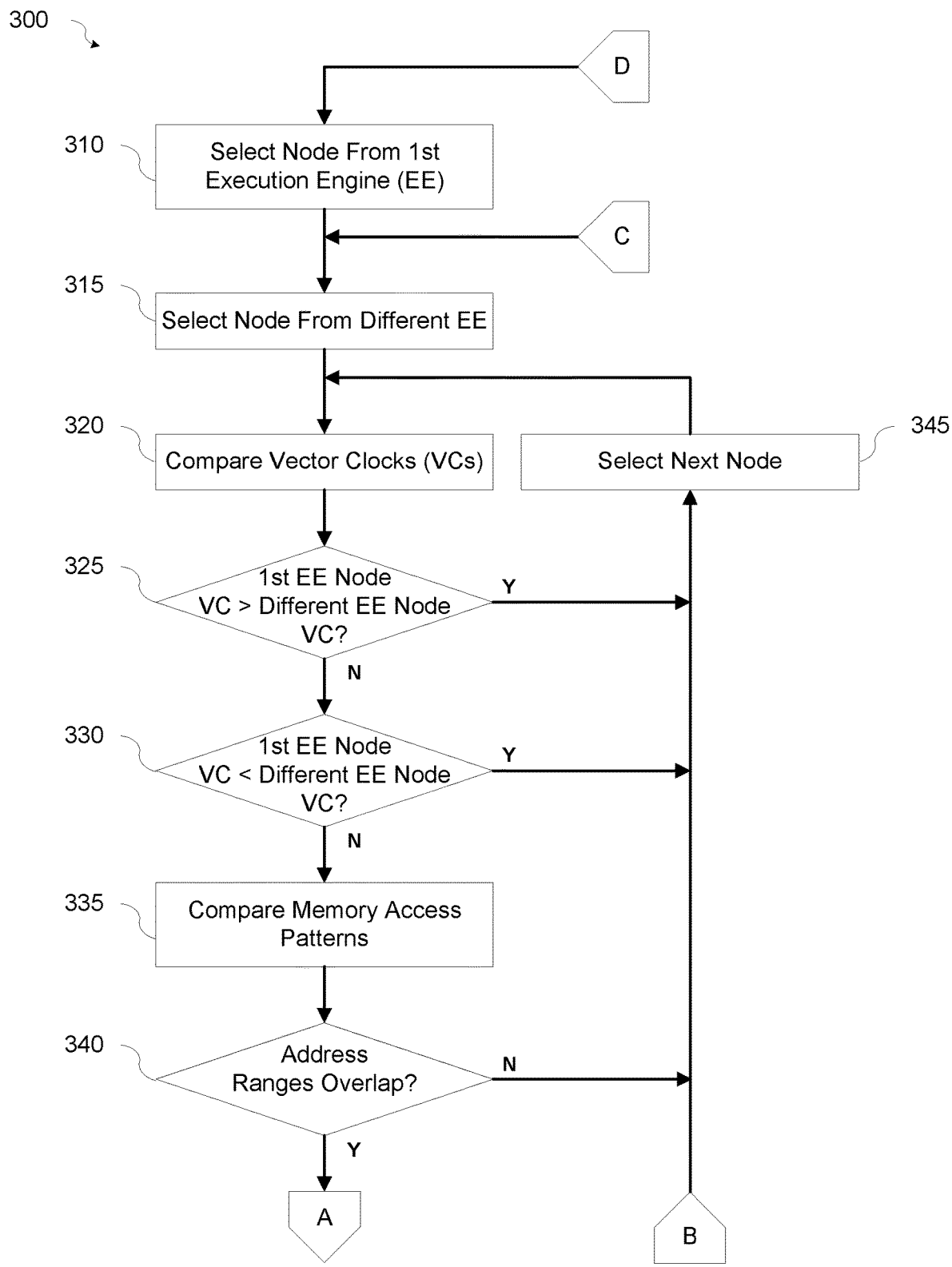
FIGS. 3A and 3B are flowcharts illustrating an example of a method for detecting a data race condition between operations performed by different execution engines according to aspects of the present disclosure.
Figure 3B:
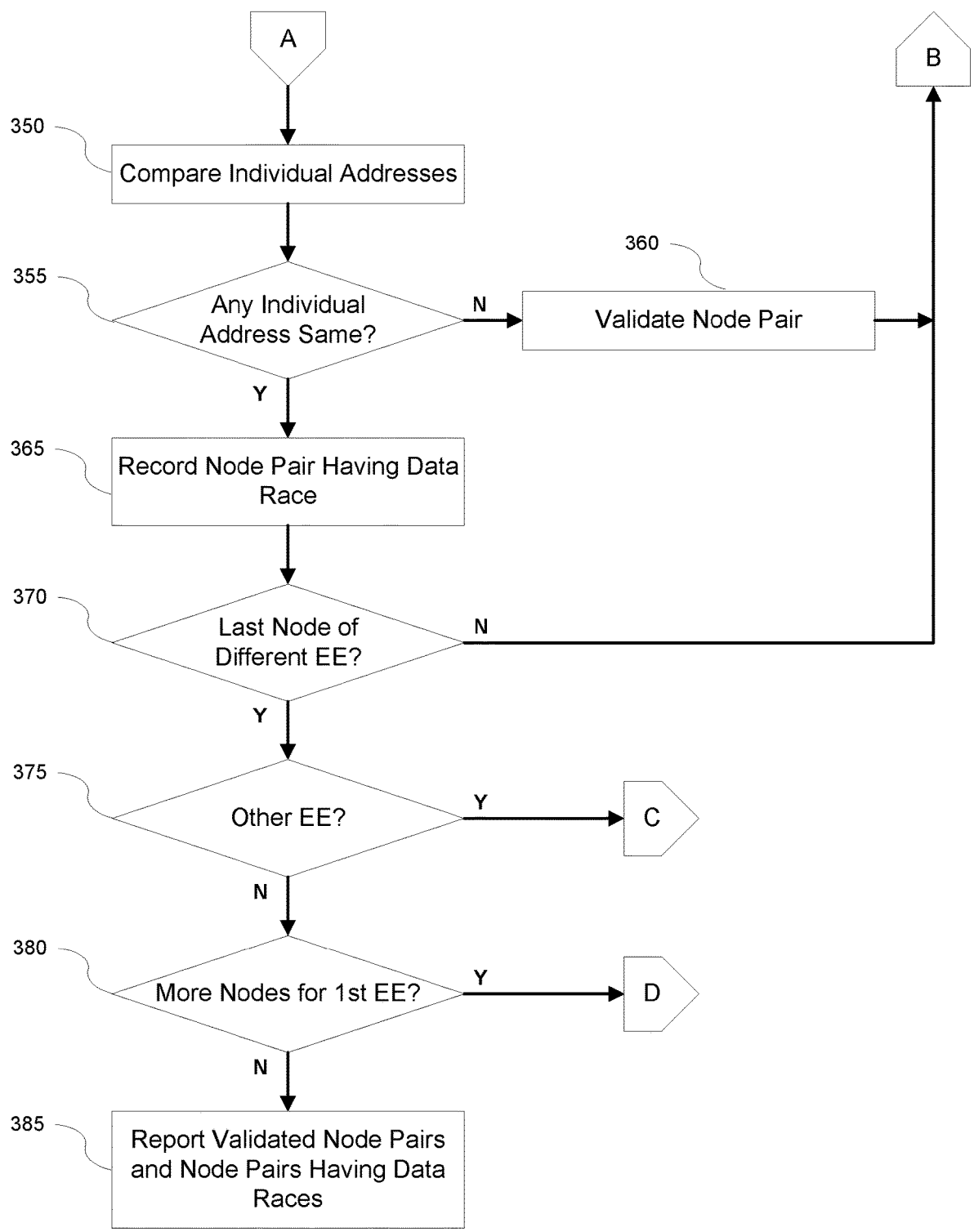

FIGS. 3A and 3B are flowcharts illustrating an example of a method 300 for detecting a data race condition between operations performed by different execution engines according to aspects of the present disclosure. Each node of a given execution engine may be compared with nodes for all other execution engines. These methods may be implemented for the systems described, for example, with respect to FIGS. 6 and 7.

Referring to FIGS. 3A and 3B, at block 310, the program executing on the processor may select from the network description a first node corresponding to an operation performed by a first execution engine. At block 315, a second node corresponding to an operation performed by a second execution engine may then be selected from the network description by the software tool.

At block 320, the vector clocks of the selected nodes may be compared. Vector clock values may be compared on an element-by-element basis. A vector clock value for one node is less than a vector clock value for another node if no element of the vector clock of the one node has a value greater than the corresponding element value of the vector clock from the other node, and at least one element of the vector clock of the one node has a value less than the corresponding element value of the vector clock from the other node.

Figure 4:
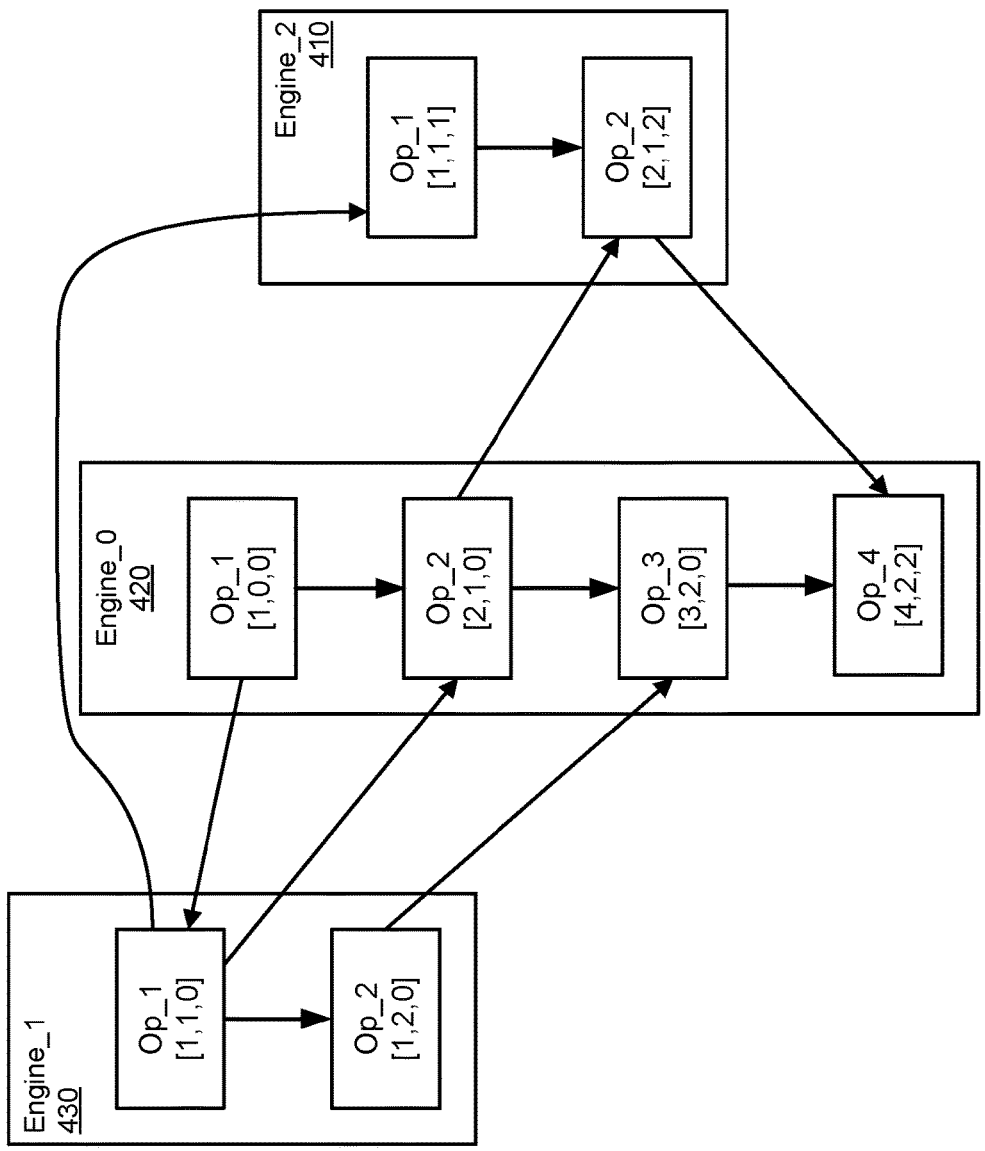
FIG. 4 is a diagram illustrating an example of a dependency graph including vector clocks for operations performed by different execution engines according to some aspects of the present disclosure.

FIG. 4 is a diagram illustrating an example of a dependency graph 400 including vector clocks for operations performed by different execution engines according to some aspects of the present disclosure. FIG. 4 shows three execution engines, Engine_0 420, Engine_1 430, and Engine_2 410, and the dependencies between their operations. The execution engines may be, for example, but not limited to, processors, processing element arrays, computation engines executing pooling operations, computation engines executing activation functions, Direct Memory Access (DMA) engines, or DMA queues of DMA engines, etc. Referring to FIG. 4, vvc[Engine_1] [Op_2]=[1, 2, 0] is less than vvc[Engine_0] [Op_3]=[3, 2, 0] since the value of element_0 of vvc[Engine_1] [Op_2] is less than the value of element_0 of vvc[Engine_0] [Op_3], while elements 1 and 2 of vvc[Engine_1] [Op_2] and vvc[Engine_0] [Op_3] have equal values.

A vector clock value for one node is greater than a vector clock value for another node if no element of the vector clock of the one node has a value less than the corresponding element value of the vector clock from the other node, and at least one element of the vector clock of the one node has a value greater than the corresponding element value of the vector clock from the other node. Referring again to FIG. 4, vvc[Engine_1] [Op_2]=[1, 2, 0] is greater than vvc[Engine_0] [Op_1]=[1, 0, 0] since the value of element_1 of vvc[Engine_1] [Op_2] is greater than the value of element_1 of vvc[Engine_0] [Op_1], while elements 0 and 2 of vvc[Engine_1] [Op_2] and vvc[Engine_0] [Op_1] have equal values.

A vector clock value for one node is neither less than nor greater than a vector clock value for another node if each vector clock has element values that are both less than and greater than the corresponding element values. Referring again to FIG. 4, vvc[Engine_1] [Op_2]=[1, 2, 0] is neither less than nor greater than vvc[Engine_0] [Op_2]=[2, 1, 0] since the value of element_0 of vvc[Engine_1] [Op_2] is less than the value of element_0 of vvc[Engine_0] [Op_2], while the value of element_1 of vvc[Engine_1] [Op_2] is greater than the value of element_1 of vvc[Engine_0] [Op_3]. The value of Element_2 of vvc[Engine_1] [Op_2] is equal to the value of element_2 of vvc[Engine_0] [Op_2]. Vector clock values that are neither less than nor greater than each other may provide an indication that the associated operations are concurrent.

Referring again to FIGS. 3A and 3B, at block 325, it may be determined whether a vector clock value for the first node of the first execution engine is greater than a vector clock value of the second node of the second execution engine.

In response to determining that the vector clock value for the first node of the first execution engine is greater than the vector clock value of the second node of the second execution engine (325—Y), at block 345, a next node of the second execution engine may be selected for comparison against the first node of the first execution engine.

In response to determining that the vector clock value for the first node of the first execution engine is not greater than the vector clock value of the second node of the second execution engine (325—N), at block 330, it may be determined whether the vector clock value for the first node of the first execution engine is less than the vector clock value of the second node of the second execution engine.

In response to determining that the vector clock value for the first node of the first execution engine is less than the vector clock value of the second node of the second execution engine (330—Y), at block 345, a next node of the second execution engine may be selected for comparison against the first node of the first execution engine.

In response to determining that the vector clock value for the first node of the first execution engine is not less than the vector clock value of the second node of the second execution engine (330—N), at block 335, the memory access patterns for the first node of the first execution engine and the second node of the second execution engine may be compared to determine whether they read from or write to memory addresses within a same memory address range.

At block 340, it may be determined whether memory address ranges for the memory access patterns for the first node of the first execution engine and the second node of the second execution engine overlap. For example, operations performed by different execution engines may read from or write to memory addresses within a same memory address range.

In response to determining that the memory address ranges do not overlap (340—N), at block 345, a next node of the second execution engine may be selected for comparison against the first node of the first execution engine.

In response to determining that the memory address ranges do overlap (340—Y), at block 350, the individual memory addresses in the overlapping portion of the memory address ranges may be compared. For example, operations performed by different execution engines may read from or write to memory addresses within a same address range, but the operations of one execution engine may access only odd addresses while the operations of the other execution engine may access only even addresses.

At block 355, it may be determined whether any of the individual memory addresses in the overlapping portion of the memory address ranges are accessed by the operations of the nodes of the first execution engine and the second execution engine. The operations, or nodes, may interfere when both operations write to at least one common memory address, or one operation reads data from a memory address and the other operation writes data to the same memory address.

In response to determining that none of the individual memory addresses in the overlapping portion of the memory address ranges are accessed by the operations of the nodes of the first execution engine and the second execution engine (355—N), at block 360, the node pair may be validated as not having a data race condition, and the method may continue at block 345, by selecting a next node of the second execution engine for comparison against the first node of the first execution engine.

In response to determining that at least one of the individual memory addresses in the overlapping portion of the memory address ranges is accessed by the operations of the nodes of the first execution engine and the second execution engine (355—Y), at block 365, the node pair may be recorded as having a data race condition. For example, operations, or nodes, interfere when both operations write to at least one common memory address, or one operation reads data from a memory address and the other operation writes data to the same memory address.

At block 370, it may be determined whether the last node for the second execution engine has been compared with the first node of the first execution engine. In response to determining that the last node for the second execution engine has not been compared with the first node of the first execution engine (370—N), at block 345, a next node of the second execution engine may be selected for comparison against the first node of the first execution engine.

In response to determining that the last node for the second execution engine has been compared with the first node of the first execution engine (370—Y), at block 375, it may be determined whether nodes of other execution engines remain to be compared against of the first node of the first execution engine.

In response to determining that nodes of other execution engines remain to be compared (375—Y), the process may continue at block 315 to select a node from another execution engine different from the first execution engine.

In response to determining that no nodes of other execution engines remain to be compared (375—N), at block 380, it may be determined whether additional nodes of the first execution engine remain to be compared against nodes of the other execution engines. In response to determining that additional nodes of the first execution engine remain to be compared (380—Y), the process may continue at block 310 to select another node from the first execution engine.

In response to determining that no additional nodes of the first execution engine remain to be compared (380—N), at block 385, the validated node pairs and/or node pairs having data races may be reported. For example, the software tool executing on the processor may generate an output report of the node pairs having potential race conditions for further investigation.

The method of FIGS. 3A and 3B may be repeated with each execution engine taken in turn as the first execution engine whose nodes will be compared to the nodes of the other execution engines. In some implementations, repeated comparisons of nodes between execution engines may be omitted. Referring again to FIG. 4, Engine_0 420 may be taken as the first execution engine for the method of FIGS. 3A and 3B, and the nodes of Engine_0 420 may be compared to the nodes of Engine_1 430 and Engine_2 410 according to the method. When Engine_1 430 is subsequently taken as the first execution engine to perform the method, the nodes of Engine_1 420 may be compared to only the nodes of Engine_2 410 since the comparison with Engine_0 420 has already been performed with Engine_0 420 as the first execution engine.

It should be appreciated that the specific steps illustrated in FIGS. 3A and 3B provide a particular method for detecting a data race condition between operations performed by different execution engines according to an embodiment of the present invention. Other sequences of steps may also be performed according to alternative embodiments. For example, alternative embodiments of the present invention may perform the steps outlined above in a different order. Moreover, the individual steps illustrated in FIGS. 3A and 3B may include multiple sub-steps that may be performed in various sequences as appropriate to the individual step. Furthermore, additional steps may be added or removed depending on the particular applications. One of ordinary skill in the art would recognize many variations, modifications, and alternatives.

The method 300 may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

According to some aspects of the present disclosure, it may be unnecessary to compare every node of a given execution engine with a node of interest. For a given node of interest of a first execution engine, the nodes of a second execution engine to be compared will have a sequential order with respect to the node of interest. The graph of the nodes of the second execution engine may be divided into an initial segment, a middle segment, and a final segment according to their vector clock values. The nodes in the initial segment may have vector clock values less than the vector clock value of the node of interest. The nodes in the final segment may have vector clock values greater than the vector clock value of the node of interest. The nodes in the middle segment may have vector clock values that are neither greater than nor less than the vector clock value of the node of interest, indicating that the operations of the nodes in the middle segment are concurrent with the operations of the node of interest. Memory accesses for only these nodes of the second execution engine in the middle segment of the graph may be compared with memory accesses of the node of interest.

Figure 5A:
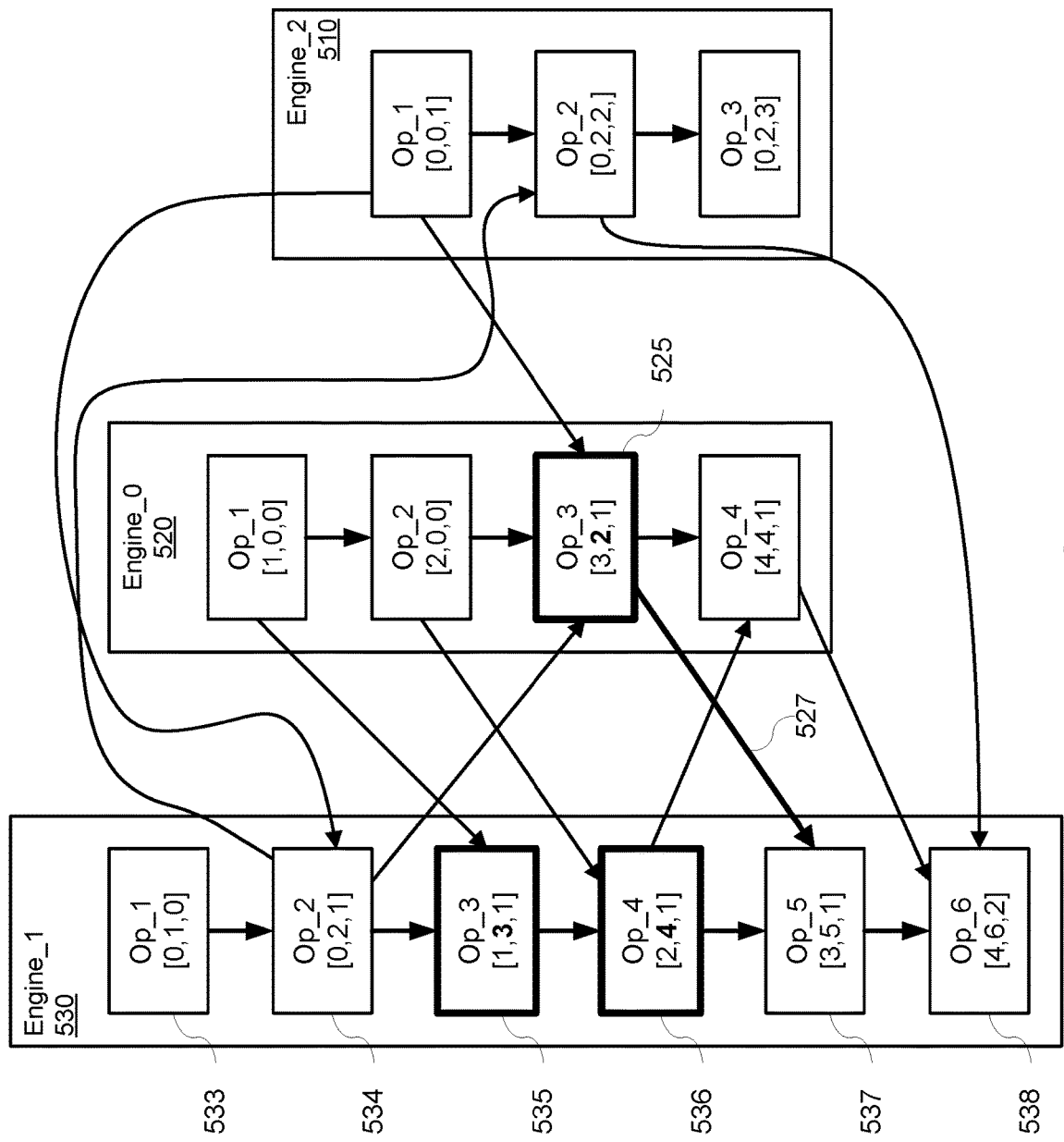
FIG. 5A is a diagram illustrating an example of a dependency graph including vector clocks for operations performed by different execution engines according to some aspects of the present disclosure.

FIG. 5A is a diagram illustrating an another example of a dependency graph 500 including vector clocks for operations performed by different execution engines according to some aspects of the present disclosure. FIG. 5A shows three execution engines, Engine_0 520, Engine_1 530, and Engine_2 510, and the dependencies between their operations. The execution engines may be, for example, but not limited to, processors, processing element arrays, computation engines executing pooling operations, computation engines executing activation functions, Direct Memory Access (DMA) engines, or DMA queues of DMA engines, etc.

Referring to FIG. 5A, node Op_3 525 of execution Engine_0 520 may be taken as the node of interest to be compared against the nodes of Engine_1 530. Rather than checking the memory accesses for the operations of every node of Engine_1 530, the middle segment of nodes in the graph (e.g., concurrent nodes) can be determined, and memory accesses for only those nodes in the middle segment of the graph may be checked for data race conditions. The middle segment of nodes corresponds to operations in which a potential data race may be present. Nodes or operations in the initial segment do not pose a potential race condition because the node of interest (e.g., Op_3 525 of execution Engine_0 520) is dependent on these operations in the initial segment (e.g., Op_1 533 and Op_2 534 of execution Engine_1 530), and execution of the node of interest may not occur until the operations in the initial segment have completed. Nodes or operations in the final segment also do not pose a potential race condition because the operations in the final segment (e.g., Op_1 533 and Op_2 534 of execution Engine_1 530) may not occur until the operation of the node of interest (e.g., Op_3 525 of execution Engine_0 520) has completed. It should be noted that in some implementations, the nodes of an execution engine may not have any initial segment or final segment relative to the node of interest of another engine. Further, in some implementations, the nodes of an execution engine may not have a middle segment relative to the node of interest of another engine.

The upper bound of the middle segment of the graph for Engine_1 530 may be determined from the vector clock value of the node of interest (Op_3 525 of Engine_0 520) by comparing the value of the vector clock element corresponding to Engine_1 530. Using the notation explained above, vvc[Engine_0] [Op_3]=[3, 2, 1], where the value of element_0=3 corresponds to Engine_0, the value of element_1=2 corresponds to Engine_1, and the value of element_2=1 corresponds to Engine_2. The upper bound of the middle segment of the graph for Engine_1 530 may be determined as the node of Engine_1 530 having a value of the vector clock element corresponding to Engine_1 530 that is one greater than the value of the vector clock element corresponding to Engine_1 530 of the node of interest. As shown in FIG. 5, vvc[Engine_1] [Op_3]=[1, 3, 1], where the value of element_1=3 corresponding to Engine_1 is one greater than the vvc[Engine_0] [Op_3]=[3, 2, 1], where the value of element_1=2 corresponds to Engine_1. Thus, node Op_3 535 of Engine_1 530 may be determined to be the upper bound of the middle segment of the graph for Engine_1 530.

The lower bound of the middle segment of the graph for Engine_1 530 may be determined based on an outgoing edge from the node of interest to a node of the execution engine being compared. As shown in FIG. 5, the node of interest (Op_3 525 of Engine_0 520) has an outgoing edge 527 to node Op_5 537 of Engine_1 530. The lower bound of the middle segment of the graph for Engine_1 530 may be determined as the node of Engine_1 530 having a value of the vector clock element corresponding to Engine_1 530 that is one less than the value of the vector clock element corresponding to Engine_1 530 of the node receiving an input edge from of the node of interest. In FIG. 5, the node Op_5 537 of Engine_1 530 receives the input edge from the node of interest (Op_3 525 of Engine_0 520), and has vvc[Engine_1] [Op_5]=[3, 5, 1], where the value of element_1=5 corresponds to Engine_1. Thus, the node Op_4 536 may be determined as the lower bound of the middle segment of the graph for Engine_1 530 since vvc[Engine_1] [Op_4]=[2, 4, 1], where the value of element_1=4 is one less than the value of element_1=5 for vvc[Engine_1] [Op_5].

Accordingly, the middle segment of the graph for Engine_1 530 may be determined to include Op_3 535 and Op_4 536, and only those nodes may be checked for data race conditions against the node of interest. In cases where the node of interest does not have an outgoing edge to a node of the execution engine being compared, the middle segment of the graph may be determined to include the upper bound node and each of the subsequent nodes.

FIG. 5B is a table summarizing results of determining graph segments of FIG. 5A described above, according to some aspects of the present disclosure. As shown in FIG. 5B, node Op_3 of execution engine Engine_0 has a vector clock value greater than the vector clock values of nodes Op_1 and Op_2 of execution engine Engine_1. Nodes Op_1 and Op_2 of execution engine Engine_1 may therefore be determined to be included in the initial segment of the graph. Further, node Op_3 of execution engine Engine_0 has a vector clock value less than the vector clock values of nodes Op_5 and Op_6 of execution engine Engine_1. Nodes Op_5 and Op_6 of execution engine Engine_1 may therefore be included in the final segment of the graph.

Node Op_3 of execution engine Engine_0 has a vector clock value that is neither greater than nor less than the vector clock values of nodes Op_3 and Op_4 of execution engine Engine_1, indicating that the operations of these nodes are concurrent. Accordingly, nodes Op_3 and Op_4 of execution engine Engine_1 can be included in the middle segment of the graph, and these nodes may be checked for data race conditions against node Op_3 of execution engine Engine_0.

Figure 6:
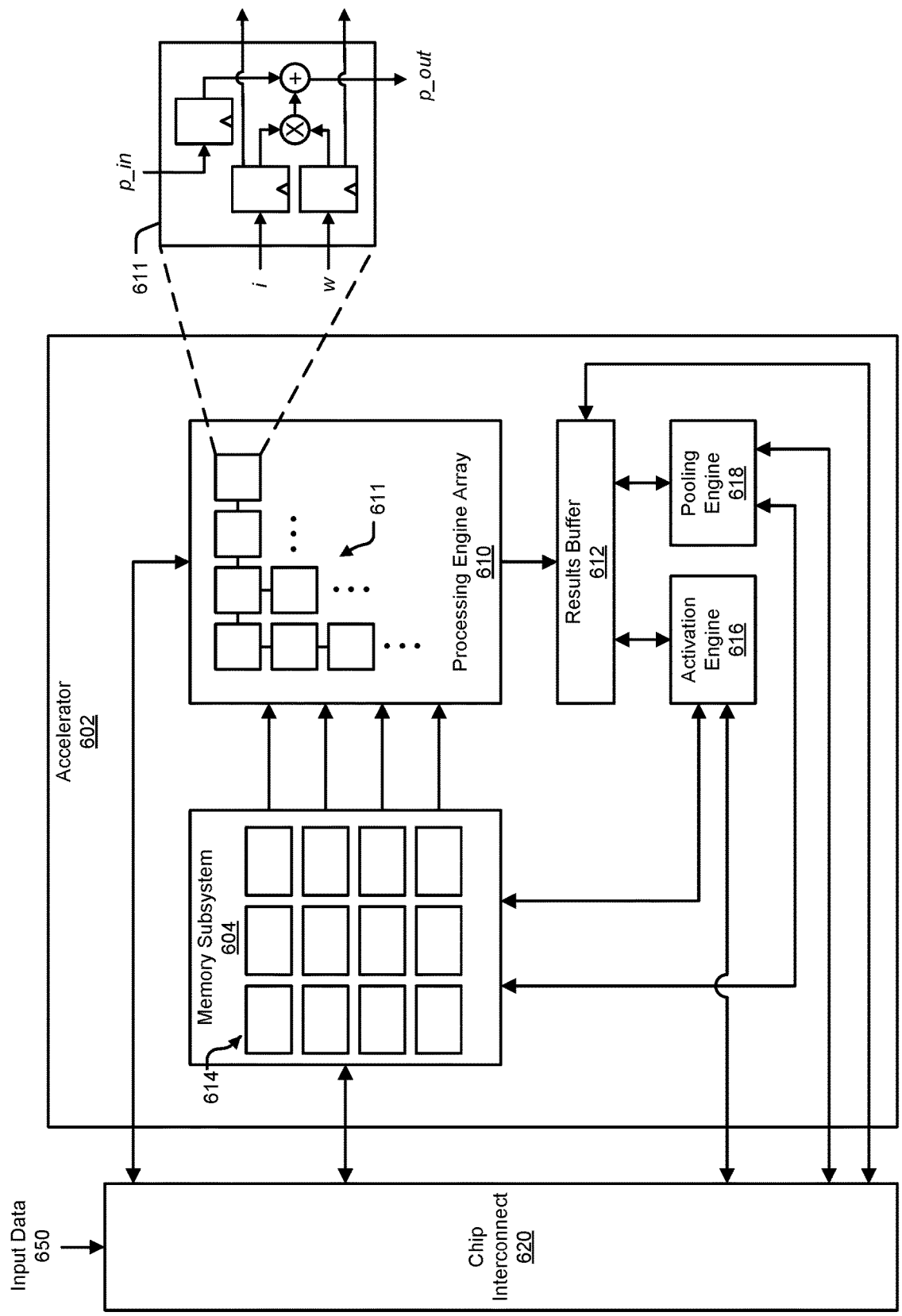
FIG. 6 is a block diagram illustrating an example of an integrated circuit device according to some aspects of the present disclosure.

FIG. 6 is a block diagram illustrating an example of an integrated circuit device for which the methods according to the present disclosure may be implemented. The example of FIG. 6 illustrates an accelerator 602. In various examples, the accelerator 602, for a set of input data (e.g., input data 650), can execute computations using a processing engine array 610, an activation engine 616, and/or a pooling engine 618. In some examples, the example accelerator 602 may be an integrated circuit component of a processor, such as a neural network processor. The processor may have other integrated circuit components, including additional accelerator engines.

In various implementations, the memory subsystem 604 can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616 and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 428 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, pin, provided either from another processing engine 611 or from a previous round of computation by the processing engine array 610. When starting a computation for a new set of input data, the top row of the processing engine array 610 can receive a fixed value for p_in, such as zero. As illustrated by this example, i and w are multiplied together and the result is summed with p_in to produce a new partial sum, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

Herein, the activation engine 616 and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616 and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
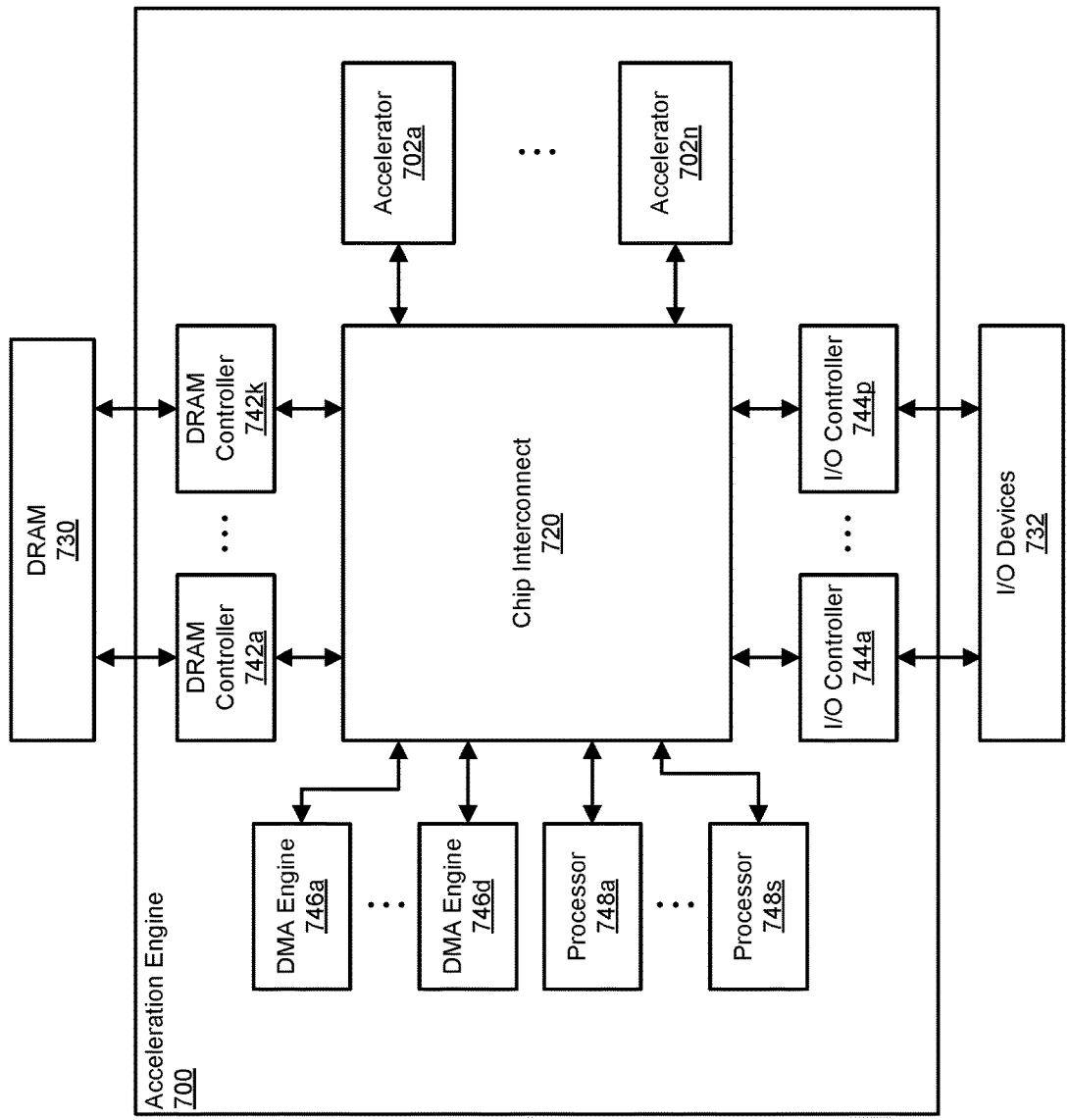
FIG. 7 includes a block diagram that illustrates an example of an acceleration engine according to some aspects of the present disclosure.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Figure 8:
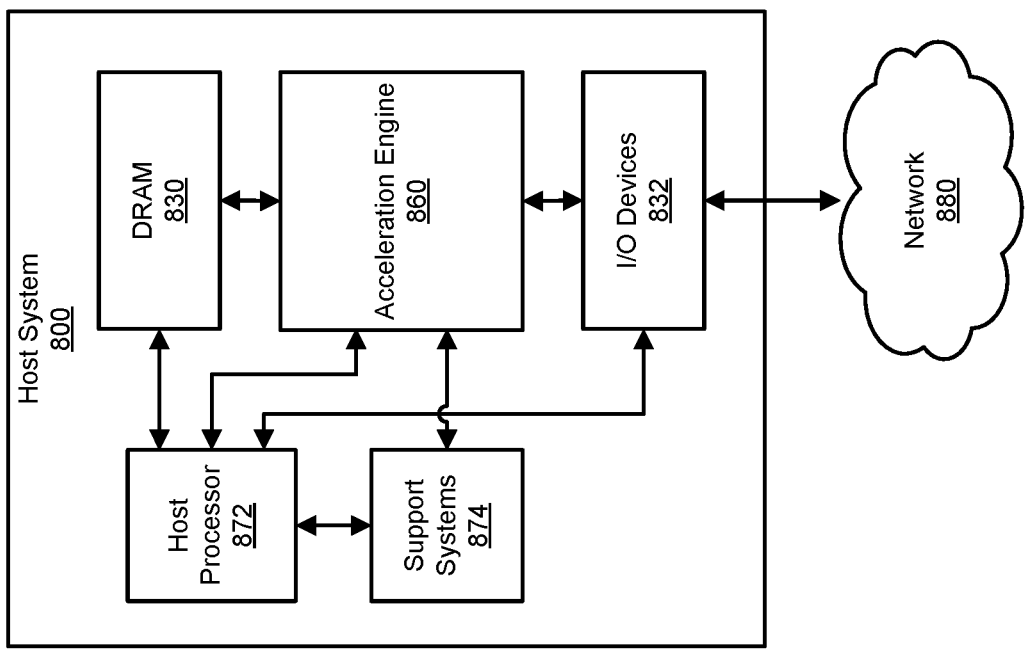
FIG. 8 includes a block diagram that illustrates an example of a host system in which an acceleration engine can be used according to some aspects of the present disclosure.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for detecting a data race condition between execution engines of an integrated circuit device, the method comprising:
    obtaining a dependency graph generated by a compiler;
    based on the dependency graph, selecting a first operation to be performed by a first execution engine;
    comparing a vector clock of the first operation with a vector clock of a second operation to be performed by a second execution engine;
    determining that the vector clock of the first operation is not greater than and not less than the vector clock of the second operation;
    comparing a memory access pattern of the second operation with a memory access pattern of the first operation;
    determining that a memory address range of the second operation overlaps with a memory address range of the first operation;
    comparing, in an overlapping memory range, individual memory addresses accessed by the second operation with individual memory addresses accessed by the first operation;
    determining that the second operation accesses a same memory address as the first operation; and
    determining that a data race condition exists.

2. The computer-implemented method of claim 1, wherein each vector clock has a same number of elements as a number of execution engines.

3. The computer-implemented method of claim 1, wherein comparing the vector clock of the first operation with the vector clock of the second operation comprises comparing a value of each element of the vector clock of the first operation with a value of a corresponding element of the vector clock of the second operation.

4. The computer-implemented method of claim 1, wherein determining that the vector clock of the first operation is not greater than and not less than the vector clock of the second operation comprises:
    determining that a value of at least one element of the vector clock of the first operation is greater than a value of a corresponding element of the vector clock of the second operation; and
    determining that a value of at least one element of the vector clock of the second operation is greater than a value of a corresponding element of the vector clock of the first operation.

5. A method, comprising:
    selecting a first execution engine and a second execution engine from a plurality of execution engines of an integrated circuit device, wherein the first execution engine is configured to perform a first set of operations, and the second execution engine is configured to perform a second set of operations;
    selecting a first operation from the first set of operations;
    determining a concurrent operation in the second set of operations that is concurrent with the selected first operation by comparing a vector clock of the first operation with vector clocks of the operations in the second set of operations;
    determining that the first operation and the concurrent operation access different memory locations; and
    validating that the first operation of the first execution engine does not have a data race condition with the concurrent operation of the second execution engine.

6. The method of claim 5, wherein comparing the vector clock of the first operation with the vector clock of the concurrent operation comprises comparing a value of each element of the vector clock of the first operation with a value of a corresponding element of the vector clock of the concurrent operation.

7. The method of claim 5, wherein determining the concurrent operation in the second set of operations comprises determining that the vector clock of the first operation is not greater than and not less than the vector clock of a second operation of the operations in the second set of operations.

8. The method of claim 7, wherein determining that vector clocks are not greater than and not less than each other comprises:
   determining that a value of at least one element of the vector clock of the first operation is greater than a value of a corresponding element of the vector clock of the second operation; and
   determining that a value of at least one element of the vector clock of the second operation is greater than a value of a corresponding element of the vector clock of the first operation.

9. The method of claim 5, wherein each vector clock comprises a number of elements equal to a number of execution engines, and
   each element of a vector clock represents operations executed by a corresponding execution engine.

10. The method of claim 5, wherein determining that the first operation and the concurrent operation access different memory locations comprises:
    determining memory access patterns of the first operation and the concurrent operation; and
    determining that memory address ranges for the memory access patterns do not overlap.

11. The method of claim 5, wherein determining that the first operation and the concurrent operation access different memory locations comprises:
    determining memory access patterns of the first operation and the concurrent operation;
    determining that memory address ranges for the memory access patterns overlap; and
    determining that the first operation and the concurrent operation do not access a same memory address within an overlapping memory address range.

12. The method of claim 5, further comprising:
    selecting a second operation from the first set of operations;
    determining a second concurrent operation in the second set of operations that is concurrent with the selected second operation;
    determining that the second operation and the second concurrent operation access a same memory location; and
    reporting the second operation and the second concurrent operation as having a race condition.

13. The method of claim 5, wherein the plurality of execution engines includes a processing engine array, a pooling engine, an activation engine, or a Direct Memory Access (DMA) engine.

14. The method of claim 5, wherein values of vector clock elements are integer values.

15. A non-transitory computer readable medium having stored therein instructions that, when executed by one or more processors cause the one or more processors to execute operations including:
    selecting a first execution engine and a second execution engine from a plurality of execution engines of an integrated circuit device, wherein the first execution engine is configured to perform a first set of operations, and the second execution engine is configured to perform a second set of operations;
    selecting a first operation from the first set of operations;
    determining a concurrent operation in the second set of operations that is concurrent with the selected first operation by comparing a vector clock of the first operation with vector clocks of the operations in the second set of operations;
    determining that the first operation and the concurrent operation access different memory locations; and
    validating that the first operation of the first execution engine does not have a data race condition with the concurrent operation of the second execution engine.

16. The non-transitory computer readable medium of claim 15, wherein determining the concurrent operation in the second set of operations comprises determining that the vector clock of the first operation is not greater than and not less than the vector clock of a second operation of the operations in the second set of operations.

17. The non-transitory computer readable medium of claim 15, wherein comparing the vector clock of the first operation with the vector clock of the concurrent operation comprises comparing a value of each element of the vector clock of the first operation with a value of a corresponding element of the vector clock of the concurrent operation.

18. The non-transitory computer readable medium of claim 15, wherein each vector clock comprises a number of elements equal to a number of execution engines, and
    each element of a vector clock represents operations executed by a corresponding execution engine.

19. The non-transitory computer readable medium of claim 15, wherein determining that the first operation and the concurrent operation access different memory locations comprises:
    determining memory access patterns of the first operation and the concurrent operation; and
    determining that memory address ranges for the memory access patterns do not overlap.

20. The non-transitory computer readable medium of claim 15, wherein the plurality of execution engines includes a processing engine array, a pooling engine, an activation engine, or a Direct Memory Access (DMA) engine.

* * * * *